Figure 1:
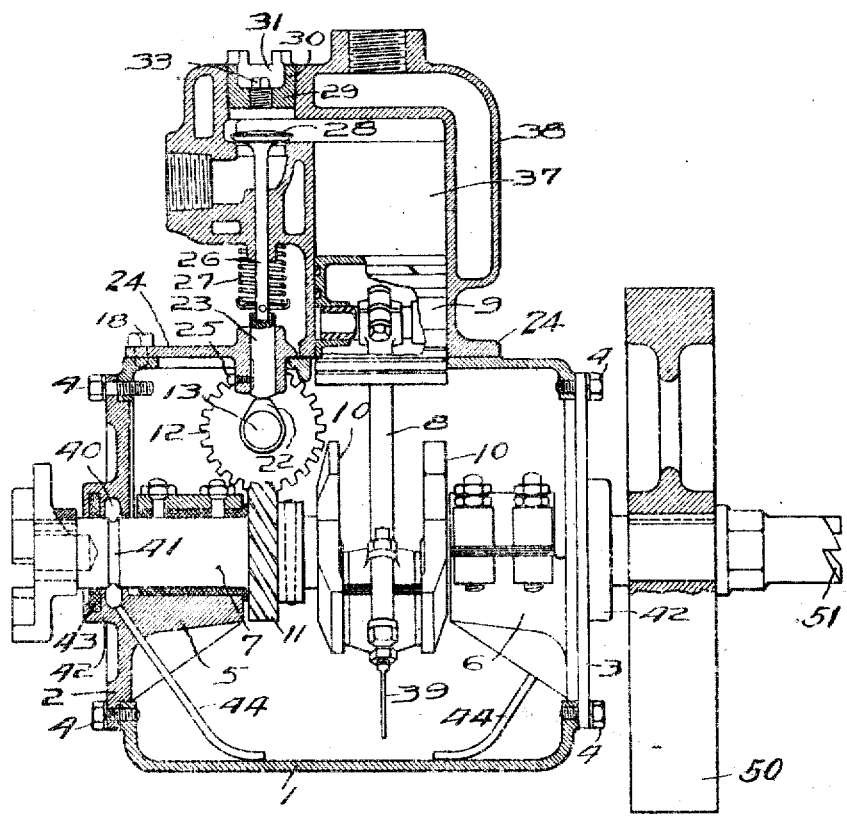

M. C. COSGRAY.
ENGINE.
APPLICATION FILED JULY 26, 1918.

1,299,555.

Patented Apr. 8, 1919.
2 SHEETS—SHEET 1.

INVENTOR
Mark C. Cosgray.
by
Owen Owen & Crampton

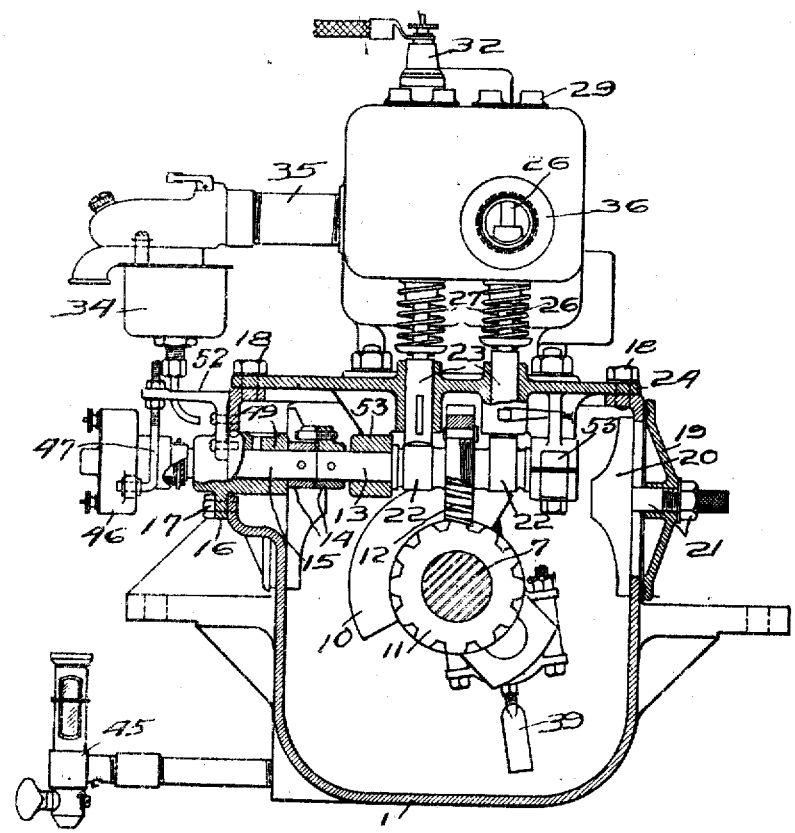

UNITED STATES PATENT OFFICE.

MARK C. COSGRAY, OF SANDUSKY, OHIO, ASSIGNOR TO THE MATHEWS ENGINEERING COMPANY, OF SANDUSKY, OHIO, A CORPORATION OF OHIO.

ENGINE.

1,299,555.  Specification of Letters Patent.  Patented Apr. 8, 1919.

Application filed July 26, 1918. Serial No. 246,944.

*To all whom it may concern:*

Be it known that I, MARK C. COSGRAY, a citizen of the United States, and a resident of Sandusky, in the county of Erie and State of Ohio, have invented a certain new and useful Engine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to engines and it has for its object to provide an efficient engine wherein the parts may be readily assembled and disassembled for purposes of repair and replacement. It also has for its object to provide certain features and advantages that will appear in the description hereinafter. Features involving the use of my invention may be used in different forms of engines. I have selected one form of engine as illustrative of engines embodying the use of my invention and shall describe it hereinafter. The engine selected is illustrated in the accompanying drawings.

Figure 1 of the drawings is a longitudinal sectional view of the engine, Fig. 2 is a transverse sectional view thereof.

1 is the crank case which is closed by large end plates 2 and 3 by means of the screw bolts 4. The plates 2 and 3 have the bearings 5 and 6 in which is located the crank shaft 7. The plates 2 and 3 being large, the crank shaft and the parts connected thereto may be readily removed from the interior of the casing 1.

8 is the piston rod which is connected to the piston 9 and to the crank pin of the crank shaft 7 in the manner well known in the art. The crank is provided with arcuate counterweights 10. A worm wheel 11 is secured to the crank shaft and a worm wheel 12 secured to the cam shaft 13 which is operated by the worm wheel 11. The axis of the crank shaft and the cam shaft are thus placed at an angle of 90° to each other. The cam shaft is supported in the bearings 53 secured to the top or cover 24 of the casing. To the cam shaft 13 is connected by means of the coupler 14 an extension 15 having bearings 49 formed in a plate 16 which is bolted to the casing 1 by means of the bolts 17. The parts of the coupling 14 may be readily separated by merely removing the plate 16. The timer 46 is connected to the extension 15 and consequently the timer and its supporting shaft may be readily removed from the engine. Opposite the other end of the cam shaft 13 is located a plate 19 that is secured in position by the removable bridge 20, the bolt and nut 21. This forms a cover for a large opening, whereby free access is made to the bearings of the cam shaft 13. The cams 22 of the cam shaft 13 operate the spring pressed valve studs 23 which are located in bosses formed in the cover plate 24 of the casing 1. The studs 23 are provided with slots into which extend the ends of screws 25 which operate to keep the studs from turning. The studs thus may be readily removed by unbolting the bolts 18 and lifting off the cover plate. This will also remove the cam shaft 13 and its cams, whereby the cam shaft mechanism may be readily removed from the casing and from the engine. Valve rods 26 are spring pressed by the springs 27 against the bottom of sockets formed in the upper ends of the studs 23. The valves 28 operate to open and close the inlet and exhaust ports of the engine in the manner well known in the art. Into the part of the wall located above the valves are threaded caps or plugs 29 having flanges 30 that extend upward from the bottom of the caps 29 and so as to form sockets 31. The upper edges of the flanges 30 are castellated in order that the threaded plugs may be inserted into or removed from the engine. In the bottom of the plug 30 is formed a threaded opening into which may be threaded either the ignition plug 32 or the plug 33. One is inserted over the valve for opening and closing the exhaust port and the other over the valve for controlling the inlet.

The carbureter 34 is connected by means of a suitable connecting pipe 35 with the inlet port of the engine. This is located on the same side of the engine that the timer is located on. While the exhaust port of the engine may be connected with a suitable pipe connected with the threaded boss 36 that opens in the direction of the shaft of the engine.

The cylinder 37 is provided with the usual water jacket 38.

Oiling of the engines is accomplished by the splash pin 39 which is secured to the piston rod 8. In order to reduce the amount of the splash and give strength to the pin 39, it may be provided with a rectangular cross section, the longer parallel sides of the rectangle being located parallel to the plane of movement of the splash pin.

To prevent the oil from working along the crank shaft 7, the plates 2 and 3 are provided with channels 40 and the shaft 7 is provided with channels 41 that register with the channels 40. The bosses 42 are also provided with channels in which are located suitable washers 43. The oil works into and through the bearing and finally into the lower part of the channels 40. Tubes 44 extend from the bottom of the channels 40 to the bottom of the case 1 and allow the oil to flow to the bottom of the case 1. An oil gage 45 may be connected to the bottom of the case 1.

A fly-wheel 50 may be connected to the shaft 7 and a suitable driving clutch may coact with the clutch member 51 for starting the engine.

To adjust the timer, a rod 47 may be connected at one end to the timer shell and adjustably secured in a bracket 52 at the other end. Rotation of the shell of the timer will vary the ignition times. Adjustment is secured by securing the rod in the proper position in the bracket 52. The plate 16 being secured to the cover plate 24, the timer and cam shaft and their parts may be all removed together from the engine by removing the plates 16 and 24 together.

I claim:—

1. In an engine, a crank shaft casing, end plates closing the crank shaft casing, crank shaft bearings formed on the inner sides of the end plates, a cover plate for closing the top of the casing and cam shaft bearings located on the inner side of the cover plate.

2. In an engine, a crank shaft casing, a cam shaft, a cover plate for closing the top of the casing and having cam shaft bearings located on the inner side of the cover plate, a timer shaft removably connected with the cam shaft, a plate having a bearing formed on the inner side thereof, the said plate for closing an opening for receiving the bearing of the timer shaft.

3. In an engine, a crank shaft casing, end plates for closing the ends of the crank shaft casing and having bearings formed on the inner side thereof, a cam shaft and valve studs, a cover plate having bearings for the cam shaft and the valve studs formed on the inner side of the cover plate, a timer shaft connected to the cam shaft, a plate having a bearing for the timer shaft and for closing an opening in the crank shaft casing for receiving the timer shaft bearing.

4. In an engine, a crank shaft casing, end plates for closing the ends of the crank shaft casing and having bearings formed on the inner side thereof, a cam shaft and valve studs, a cover plate having bearings for the cam shaft and the valve studs formed on the inner side of the cover plate, a timer shaft connected to the cam shaft, a plate having a bearing for the timer shaft and for closing an opening in the crank shaft casing for receiving the timer shaft bearing, worm gear wheels for connecting the crank shaft with the cam shaft and the timer shaft.

In testimony whereof, I have hereunto signed my name to this specification.

MARK C. COSGRAY.